United States Patent [19]

Fremin

[11] Patent Number: 4,919,983
[45] Date of Patent: Apr. 24, 1990

[54] THERMOCHROMATIC INFANT FEEDING CONTAINER

[76] Inventor: Kit C. Fremin, 25652 Rimgate #2G, El Toro, Calif. 92630

[21] Appl. No.: 177,144

[22] Filed: Apr. 4, 1988

[51] Int. Cl.⁵ .......................... A61J 9/02; G01K 11/12
[52] U.S. Cl. ................................ 428/35.7; 215/11.2; 374/150; 428/35.2; 428/320.2; 428/913; 428/321.5
[58] Field of Search ............... 374/162, 150; 523/456, 523/461; 252/586; 428/35, 320.2, 913, 321.5

[56] References Cited

U.S. PATENT DOCUMENTS

| | | | |
|---|---|---|---|
| 3,864,976 | 2/1975 | Parker | 73/356 |
| 4,045,383 | 8/1977 | Koff | 260/8 |
| 4,156,365 | 5/1979 | Heinmets et al. | 73/343 B |
| 4,228,761 | 10/1980 | Glover et al. | 116/201 |
| 4,424,990 | 1/1984 | White et al. | 285/381 |
| 4,538,926 | 12/1985 | Chretien | 374/150 |
| 4,620,941 | 11/1986 | Yoshikawa et al. | 252/408.1 |
| 4,717,710 | 1/1888 | Shimizu et al. | 503/213 |

FOREIGN PATENT DOCUMENTS

| | | | |
|---|---|---|---|
| 8600845 | 9/1987 | Brazil . | |
| 2048291 | 4/1972 | Fed. Rep. of Germany | 374/162 |
| 2105850 | 8/1972 | Fed. Rep. of Germany | 374/162 |
| 3614835 | 11/1987 | Fed. Rep. of Germany | 215/11.2 |
| 0026236 | 2/1983 | Japan | 374/162 |
| 0380027 | 4/1973 | U.S.S.R. | 374/162 |
| 1217233 | 12/1970 | United Kingdom | 374/162 |
| 1341735 | 12/1973 | United Kingdom | 215/11.2 |

Primary Examiner—Ellis P. Robinson
Assistant Examiner—Archene A. Turner
Attorney, Agent, or Firm—Willian Brinks Olds Hofer Gilson & Lione

[57] ABSTRACT

A container for feeding infants which has a body (20) formed by blow molding constructed of a thermoplastic material permitting light transmission. The container is shaped like a baby bottle or cup (28) and contains, in formulation, along with the thermoplastic material a thermochromic composition consisting of from 5 to 10 percent by weight. This combination permits the container to undergo a distinct change in color when the temperature within exceeds a given threshold providing a conspicuous indication of the liquid contents if above the human zone of comfort. Another embodiment incorporates the thermochromatic composition in the middle composite of a multi-layered polyethylene bag for use with baby feeding container having a rigid outer enclosure and a polyethylene liner bag.

12 Claims, 2 Drawing Sheets

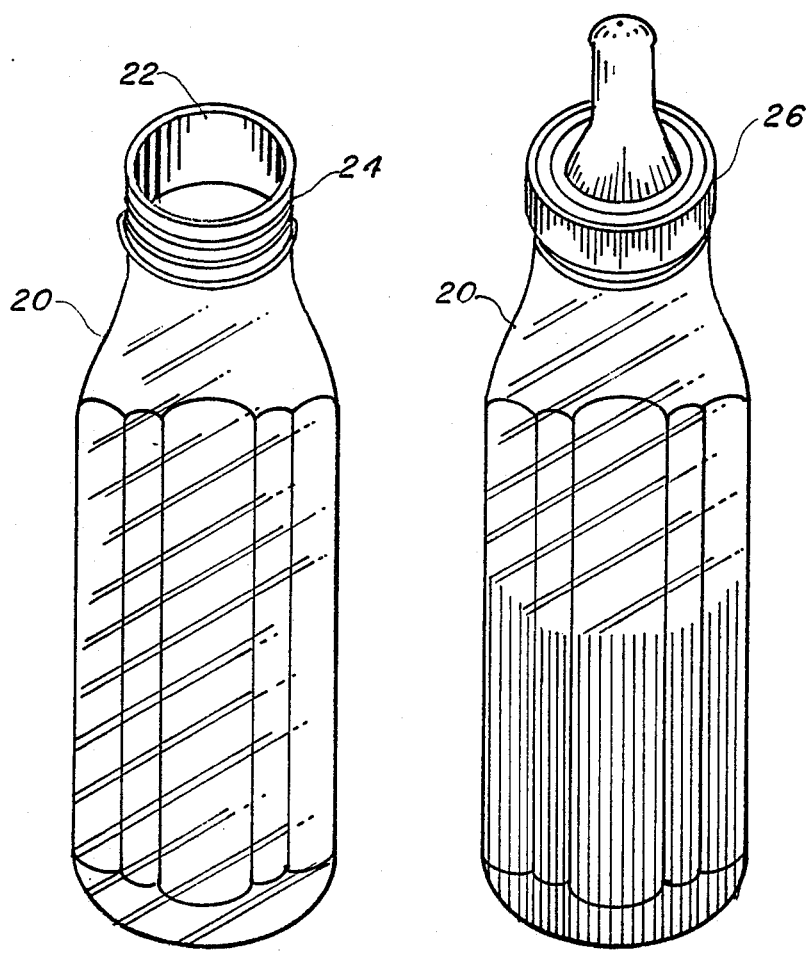
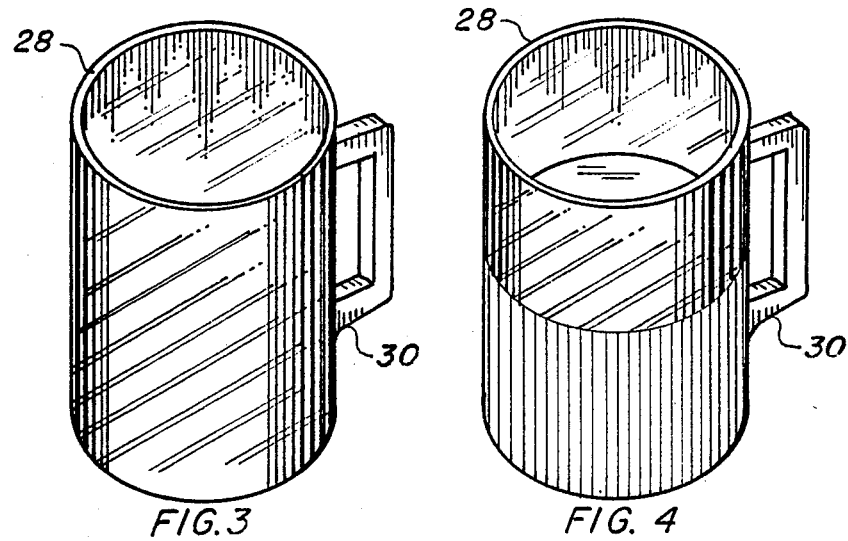

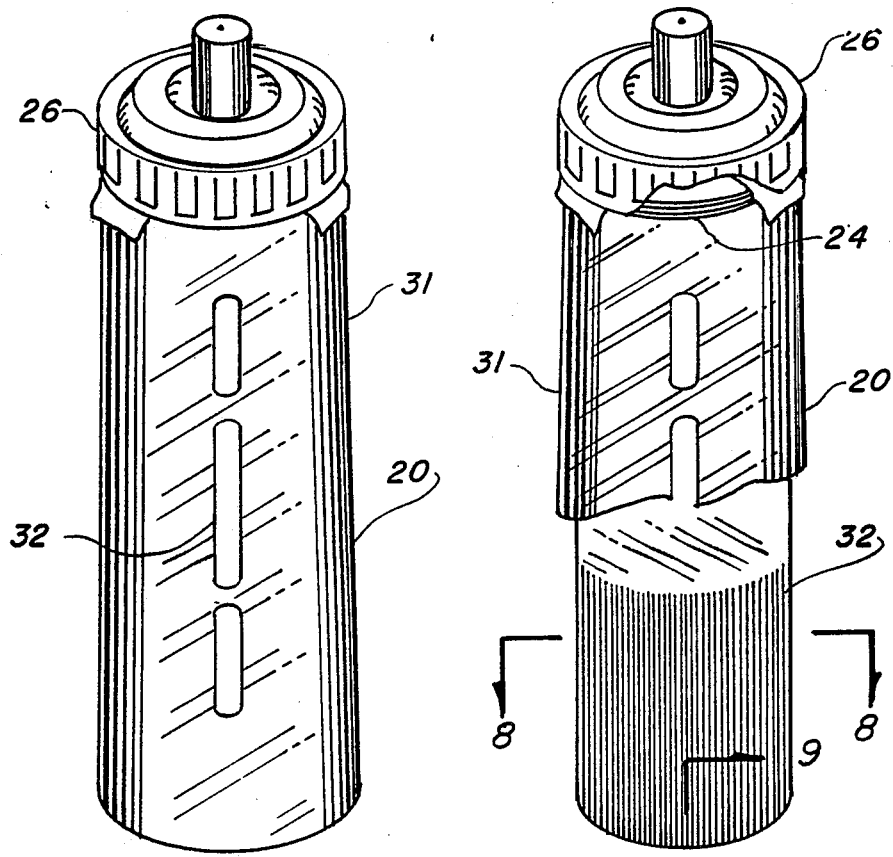
FIG. 5
FIG. 6
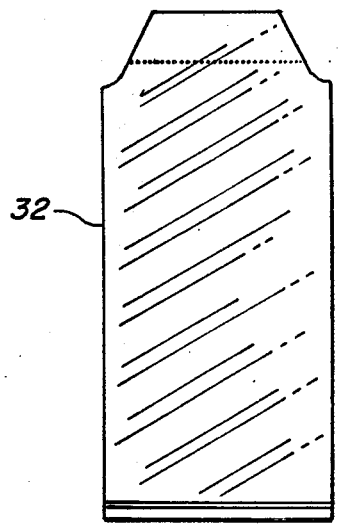
FIG. 7
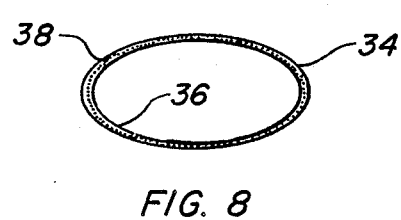
FIG. 8
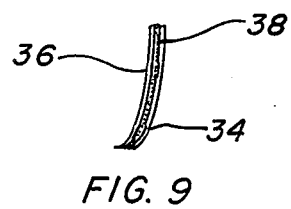
FIG. 9

THERMOCHROMATIC INFANT FEEDING CONTAINER

TECHNICAL FIELD

The present invention relates to containers for liquids in general. More specifically to containers that change color at a predetermined temperature allowing safe conditions to be observed before consumption of the liquid by an infant.

BACKGROUND ART

Previously, indication of the temperature of an infant feeding container, particularly a baby bottle, has been by touch or feel of the outside of the bottle or by shaking a few drops on ones arm in a temperature sensitive area. Since the advent of thermochromatic compositions, the addition of paint containing this substance has been used by prior art applied to the outside of the container for temperature indication. Other approaches utilize a binary mixture of cholesteric liquid crystals of various colors yielding a visual array of color related directly to the container temperature.

A search of the prior art did not disclose any patents that read directly on the claims of the instant invention, however, the following U.S. Patents were considered related:

| U.S. Pat. No. | Inventor | Issue Date |
| --- | --- | --- |
| 4,620,941 | Yoshikawa et al | Nov. 4, 1986 |
| 4,538,926 | Chretien | Sep. 3, 1985 |
| 4,424,990 | White et al | Jan. 10, 1984 |
| 4,228,761 | Glover et al | Oct. 21, 1980 |
| 4,156,365 | Heinmets et al | May 29, 1979 |
| 3,864,976 | Parker | Feb. 11, 1975 |

Chretien in U.S. Pat. No. 4,538,926 teaches a bottle with a thin supple support with a black background and an axially located binary mixture of cholesteric liquid crystals and a colored strip from red to violet with a mark on the appropriate color. The mating color of the strip to the crystals indicates the desire temperature. It will be noted that this combination is placed entirely on the surface of the container.

Glover et al utilize a heat-deformable polymeric material coated with a thermochromic paint containing a thermochromic pigment having a metallic compound. The improvement includes inhibiting degradation by the addition of a combination of non-thermochromatic compounds.

Heinmets et al discloses a vessel having a layer of thermochromic paint positioned at a location visible to the user. The temperature is indicated by a set of dots contiguous with a background of color reference and indica indicating the represented temperatures.

Parker employs a digital thermometer strip having a thin dimensionally stable plastic film with a mask leaving alpha-numeric symbols transparent. Liquid crystal compositions with transition temperatures related to the designation are coated onto the mask with the strip introduced between the films of waterpermeable plastic. The plastic exchanges the heat from the bottle upon which the strip is mounted indicating the temperature visually by the transparent or opaque nature of the crystal composition.

For background purposes and as indicative of the art to which the invention relates, reference may be made to the remaining cited patents issued to Yoshikawa et al and White et al.

DISCLOSURE OF THE INVENTION

Most approaches to solve the problem of feeding a baby with a bottle or an infant in a cup where the temperature of the liquid can burn the tongue, throat, or elsewhere in the alimentary tract have been limited to the addition of an ancillary indicating device or a coating on the outside of the vessel. While this method is effective, the addition and removal of such a device is time consuming and by its very nature becomes more of an imposition than its value. Further, the addition of a coating on the outside becomes much more acceptable in use, however, since baby bottles or cups are used continuously, and are subjected to frequent washing in hot, soapy water, or mechanical dishwashers, the life of the coating is limited and deterioration takes place quickly.

It is, therefore, a primary object of the invention to incorporate into the base material of the container thermochromatic compositions that become an integral part of the structure and are not affected by use. With the active material inherent in the container or liner itself wearing on the surface by abrasion or ablation is eliminated, thereby solving the problem completely.

An important object of the invention provides an easily read indication of the maximum temperature without close scrutiny, as the color change is obvious without orienting the container in any particular direction. Further, the content level is also visible, as the thermoplastic material may be from transparent to translucent, according to the composition. In any event, the level is easily indicated, also at any orientation of the container.

Another object of the invention is directed to the type of material selected which is not harmful to the user, as the thermoplastic material is covered by the Federal Food Additive Regulations outlined in 21CFR177.1580 and the thermochromatic formulation is basically inert.

Still another object of the invention is addressed dealing with the problem of accelerated fading due to prolonged exposure to strong ultraviolet light. The invention includes ultraviolet stabilizers primarily in the form of carbon black which offsets the effects of direct sunlight exposure and prolongs the life of the container to an acceptable life span, as infant feeding containers are usually used by the household for limited periods during specific times during the maturity of the infant.

Yet another object of the invention allows the improvement to be cost effective as the only additional cost encountered is for the thermochromatic composition additive as the base material and tooling remain the same, along with production labor, packaging, etc. The benefits of the convenience and elimination of the possibility of discomfort of the infant easily overcome the basic cost differential.

A further object allows a variety of colors to be used, such as pink, baby blue, yellow, etc., that are readily acceptable relative to infants and young children. The coloration still allows the content level to be seen and the change in color at temperatures above the thermochromic transition to that of the base material is easily decerned and recognizable in any of the principle colors utilized.

A final object of the invention is directed to an infant feeder that uses plastic bags to hold the liquid with a structural enclosure forming the interface with a nipple containing cap providing the seal with the bag and protection from breaking. The invention replaces the polyethylene bag with a laminated film having at least three layers. The outside layers are of inert polyethylene and the inner layer contains the thermochromatic composition allowing visual indication of heat through the translucent enclosure or through slots provided in the side for liquid level indication.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment in bottle form.

FIG. 2 is a partial isometric view of the preferred embodiment, in bottle form including a cap, nipple and partial contents, with the level of contents illustrated by a change in color in the area containing the liquid that is above the temperature threshold of the thermochromatic composition.

FIG. 3 is a partial isometric of the third embodiment in the form of a cup.

FIG. 4 is a partial isometric view of the third embodiment partially filled with hot liquid.

FIG. 5 is a partial isometric view of a infant feeding bottle using thermoplastic bags for liquid containment as disclosed in the second embodiment.

FIG. 6 is a cut away view as in FIG. 5 with the liquid at a temperature above the color changing threshold.

FIG. 7 is a view of a plastic liquid containing bag completely removed from the bottle for clarity.

FIG. 8 is a cross section of the bag taken along lines 8—8 of FIG. 6.

FIG. 9 is a cross section of the bag taken along lines 9—9 of FIG. 6.

BEST MODE FOR CARRYING OUT THE INVENTION

The best mode for carrying out the invention is presented in terms of a preferred, a second and a third embodiment. All embodiments are primarily designed using the same materials and composition, except the configuration and utility differ somewhat.

The preferred embodiment, as shown in FIGS. 1 and 2 is comprised of a container body 20 formed by any method well known in the art. The preferred method of forming, however, is by blow molding wherein an extruder produces a thin cylinder of plastic called a parison which is positioned between the jaws of a split mold. The mold is closed pinching off the parison and air pressure is directed inside forcing the material into the mold face creating the desired shape and wall thickness. Another acceptable method of manufacture includes multilayered blow molding either 4,5, or 6 layers are most common. With this type of manufacture barriers for aroma protection are achieved and ultraviolet barriers are easily accomplished under aseptic conditions. The container 20 contains an opening 22 on one end in which threads 24 are formed allowing a threaded cap 26 to be physically retained.

The body 20 is made of a thermoplastic or a thermoset material, with thermoplastic being preferred. The material found most suitable has the characteristics of being either transparent or translucent. One such material is polyethylene having a specific gravity of from 0.941 to 0.964 in the high density classification. This material is entirely suitable and furthermore is well adapted to the blow molded process historically being used for housing panels, battery parts, pipe, and a myriad of specialized containers, such as water, juices, detergents, and milk.

A material known by its registered trademark "LEXAN" in the ML5604PW resin has been recently introduced having crystal-clear transparency in the high density polyethylene meeting the Federal FDA regulations and is also acceptable for use with this invention.

Another harmonious material is unfilled polycarbonate having a specific gravity from 1.19 to 1.22 and a visible light transparency of from 85 to 89 percent. This material is accepted by the National Sanitation Foundation for use with potable water and the U.S. Food and Drug Administration for use in processing food. The light transmission is sufficient to indicate the level of liquid in the container and exposure to boiling water causes little dimensional change and no deleterious effect on the base material.

Another adaptable material is polyethylene terephthalate, or so called PET, with a reinforcement of from 30 to 45 percent glass. This material is optically clear and has enjoyed popularity for bottling soft drinks, liquor, and containing other foods. This formulation is safe in microwave ovens with high heat resistance and does not impart taste or odor to the food, therefore, it complies with relevant Food and Drug Administration regulations and specifications.

A further acceptable thermoplastic material that may be utilized with equal ease is known by its registered trademark K-RESIN and enjoys the same characteristics as above relative to the government regulations, light transmitting qualities, and temperature limitations.

In order to prolong the useful life of the thermochromatic composition and prevent color change and embrittlement of some of the susceptible thermoplastic material when subjected to ultraviolet rays like those created by direct sunlight, the invention utilizes an ultraviolet stabilizer. This stabilizer is added at a 2 to 2.5 percent, by weight, of the base material mix and consists of a combination of carbon black and inert stabilizers. In order to create a thermochromatic effect with any of the above thermoplastics, a thermochromatic microcapsular composition is employed. While there are many acceptable compositions, the preferred substance to create a color change effect at a temperature range between 36° celsius and 38° celsius consists of a homogenious hot solution containing 25 units (a unit of weight) of crystal lactone, 50 units of "CHINUBIN #326" (trademark, an ultraviolet absorber), 80 units of bisphenol A, 20 units of benzotriazole, 675 units of paracumyl benzylidene paraanisidine, and 100 units of "EPICOTE #828" (trademark, an epoxy resin) is mixed into 1 liter of 5% hydroxyethylcellulose aqueous solution. By stirring the mixture, oil-like drops about 10 microns in diameter are formed in a dispersion. Then, 40 units of "EPICURE U" (trademark, a hardener) is swiftly added at 40 degrees C., followed by the temperature rise to 95 degrees C., 2 hours of the heat treatment at the temperature, and then cooling. The above procedure leads to the formation of microcapsular particules, which are filtered out, washed by water, and dried. The final product is about 1000 units of microcapsular particles containing a reversibly thermochromic composite.

The particles are spherical and 12-15 microns in diameter. This composition is changed slightly to vary the color and temperature at which the color change takes place. In any event, the thermoplastic material comprises 90 to 95 percent by weight with the above thermochromatic composition relating to from 5 to 10 percent by weight.

The second embodiment is illustrated in FIGS. 5 through 9 and is an improvement of a infant feeding container produced by PLAYTEX CORPORATION. This type of container is popularly used throughout the country and consists of a rigid hollow cylindrical enclosure 31 that is open on both ends with one end having threads 24. The enclosure 31 further has a series of slots on one side that allows visual indication of the level of the liquid contained within. A nipple containing cap 26 is threadably retained on the top of the enclosure 31 and acts as a seal therebetween. The improvement consists of a coextruded bag 32 shown removed from the container 20 in FIG. 7 and in section in FIGS. 8 and 9 that has at least three layers. The layers of the bag 32 include at the least, an inert outside layer 34, an inert inside layer 36 and a inner layer 38 therebetween. The outside and inside layers 34 and 36 are formed using an inert polyethylene material preferably with a specific gravity of from 0.941 to 0.964. These layers may also contain ultraviolet stabilizers, the same as the preferred embodiment however, they are not required for the invention. The inner layer 38 is a composite of polyethylene and the same thermochromatic microcapsular composition as employed in the preferred embodiment. The advantage of this layered construction allows a totally inert material such as polyethylene to be in contact with the liquid and the same material on the outside with protection from ambient environment. Polyethylene is approved as a material suitable for food and complies with the Food and Drug Administration regulations and therefore lengthy approvals need not be acquired for its use with this aggregate as only polyethylene is in contact with the liquid. The shape of the bag 32 is basically a cylinder with the bottom sealed closed. This is accomplished by heat, welding the film together using a heated wire or the like to create a fused joint. The top may be flat or mitered as shown in FIG. 7 and is installed in the enclosure with the top edge folded over the threaded portion 24 maintaining a liquid seal between the upper surface of the enclosure 31 and the cap 26. The openings in the side of the enclosure 31 indicate the level of the liquid and the color change is visible graphically depicting the temperature when a undesirable condition is achieved. The bag 32 is disposable after use or may be reused if desired as the thermochromatic effect is a permanent element of the bag.

The third embodiment is illustrated in FIGS. 3 and 4 and incorporates basically the same material and approach as the preferred embodiment with the only difference being the shape of the container and the temperature of the color changing threshold. The configuration is that of a cup 28 which has one or more handles 30. The utility of the invention directed toward an infant or small child where protection of the person from physical harm is paramount, as in the case of hot liquids. It will be noted, however, that this invention is not particularly limited to such an application as a person of any age drinking hot liquids, such as tea or coffee, may be adversely effected by excessive temperature and may utilize the uniqueness of this invention.

In the case of infants, however, the temperature best suited for the thermochromatic transition to take place is from 39 to 40 degrees celsius and the thermochromatic composition is so formulated.

While the invention has been described in complete detail and pictorially shown in the accompanying drawings, it is not to be limited to such details, since many changes and modifications may be in the invention without departing from the spirit and the scope thereof. Hence, it is described to cover any and all modifications and forms which may come within the language and scope of the appended claims.

I claim:

1. A thermochromatic infant feeding container changing color in the presence of heat comprising,
    a cylindrically shaped container body formed by blow molding having an opening on one end with threads formed integrally therewith in such a manner as to receive a threaded cap,
    said body synthesized of a thermoplastic material having the characteristics of allowing light to be transmitted therethrough permitting the level of any contents to be visually observed, and
    said body having the thermoplastic material including a thermochromatic microcapsular composition relating to from 5 to 10 percent, by weight, of said thermoplastic material, formulated such that the container undergoes a distinct change in color at a temperature range from between 36 degrees celsius and 38 degrees celsius, with a first color below this thermochromatic transition and a second visually different color thereabove providing a conspicuous indication to one feeding an infant the temperature of the contents are not in excess of the human temperature zone of comfort.

2. The infant feeding container as recited in claim 1 wherein said thermoplastic material further comprises, polyethylene with a specific gravity of from 0.941 to 0.964.

3. The infant feeding container as recited in claim 2 further comprising, from 2 to 2.5 percent ultraviolet stabilizer to offset the damage caused by direct contact with the sun.

4. The infant feeding container as recited in claim 3 wherein said ultraviolet stabilizer comprises a combination of carbon black and inert stabilizers.

5. The infant feeding container as recited in claim 1 wherein said thermoplastic material further comprises unfilled polycarbonate having a specific gravity of from 1.19 to 1.22 and a visible light transparency of from 85 to 89 percent.

6. The infant feeding container as recited in claim 1 wherein said thermoplastic material further comprises, polyethylene terephthalate reinforced with from 30 to 45 percent glass.

7. The infant feeding container as recited in claim 1 wherein said thermochromatic microcapsular composition further comprises, 25 units by weight of crystal lactone, 50 units by weight of an ultraviolet absorber, 80 units by weight of bisphenol A, 20 units by weight of benzotriazole, 657 units by weight of para-cumyl benzylidene para-anisidine, and 100 units by weight of an epoxy resin, also 1 liter of 5% hydroxyethlycellulose aqueous solution, the composition further contains 40 units by weight of a hardener acting upon the elements creating microcapsular particles as a reversibly thermochromatic composite used in conjunction with the thermoplastic material.

8. An improved thermochromatic infant feeding container changing color in the presence of heat employing a rigid hollow cylindrical enclosure open on both ends with a nipple containing cap threadably attached to one of the open ends the improvement comprising a coextruded bag of thermoplastic material having at least three layers including a inert outside layer, an inert inside layer and an inner layer therebetween, the inner layer including a thermochromatic microcapsular composition relating to from 5 to 10 percent, by weight of said thermoplastic material, formulated such that the bag under goes a distinct change in color at a temperature range from between 36 degrees celsius and 38 degrees celsius, with a first color below this thermochromatic transition and a second visually different color thereabove providing a conspicuous indication to one feeding an infant the temperature of the contents as viewed through the enclosure are not in excess of the human temperature zone of comfort.

9. The infant feeding container as recited in claim 8 wherein said thermoplastic material further comprises, polyethylene with a specific gravity of from 0.941 to 0.964.

10. The infant feeding container as recited in claim 8 further comprising, from 2 to 2.5 percent ultraviolet stabilizer to offset the damage caused by direct contact with the sun in at least the outside layer.

11. The infant feeding container as recited in claim 10 wherein said ultraviolet stabilizer comprises a combination of carbon black and inert stabilizers.

12. The infant feeding container as recited in claim 8 wherein said thermochromatic microcapsular composition further comprises, 25 units by weight of crystal lactone, 50 units by weight of an ultraviolet absorber, 80 units by weight of bisphenol A, 20 units by weight of benzotriazole, 675 units by weight of paracumyl benzylidene para-anisidine, and 100 units by weight of an epoxy resin, also 1 liter of 5% hydroxyehtylcelluose acqueous solution, the composition further contains 40 units by weight of a hardener acting upon the elements creating microcapsular particles as a reversibly thermochromatic composite used in conjunction with the thermoplastic material.

* * * * *